United States Patent [19]

Rogers, Jr. et al.

[11] 4,321,726
[45] Mar. 30, 1982

[54] CABLE AND CONDUIT SHIELD

[76] Inventors: Arthur J. Rogers, Jr.; Marilyn J. Beardsley, both of 58 Old Webster Rd., Oxford, Mass. 01540

[21] Appl. No.: 180,033

[22] Filed: Aug. 21, 1980

[51] Int. Cl.³ .................. B65D 55/00; F16L 5/00
[52] U.S. Cl. ............................... 16/2; 285/413
[58] Field of Search ............ 16/2, 3; 285/57, 42, 285/64, 177, 400, 413, 415; 403/340, 344, 243, 195

[56] References Cited

U.S. PATENT DOCUMENTS

| | | | |
|---|---|---|---|
| 630,641 | 8/1899 | Albree | 285/413 |
| 961,987 | 6/1910 | Rust | 285/413 |
| 2,549,347 | 4/1951 | Angelone | 285/413 |
| 3,515,416 | 6/1970 | Pickert | 285/413 |
| 3,665,094 | 5/1972 | Matthews | 174/65 R |
| 3,742,119 | 6/1973 | Newman | 174/65 R |
| 3,895,833 | 7/1975 | Thiessen | 285/413 |
| 3,918,667 | 11/1975 | Madden | 174/65 R |
| 4,053,701 | 10/1977 | Ogilvie et al. | 174/48 |

FOREIGN PATENT DOCUMENTS 6709 of 1886 United Kingdom ............... 285/415

Primary Examiner—Wayne L. Shedd
Attorney, Agent, or Firm—Blodgett & Blodgett

[57] ABSTRACT

Shield for cables and conduits at the point of entry into a wall structure, the shield consisting of a pair of L-shaped plate elements, each plate element having a base portion and a leg portion; the leg portion of each plate element is adapted to overlie the base portion of the other plate element, so that the inner edges of the joined plate elements form an adjustable opening for the cable and conduit.

8 Claims, 9 Drawing Figures

CABLE AND CONDUIT SHIELD

BACKGROUND OF THE INVENTION

In general, the invention is directed to a shield for cables and conduits at the point of entry into a wall structure and, in particular to a shield for electrical cable at the point where it enters the side of the house to a fuse box or the like. Such shields are commonly used to cover openings at the point of entry of an electrical cable into buildings to prevent moisture, heat, cold, or insects from entering buildings through the space around the cables and conduits. Shields may also be used within buildings around cables and conduits such as pipes and electrical wires to provide a finished appearance and also prevent moisture, heat, cold, dust, smoke or light from passing from one room to another.

The prior art cable and conduit shield usually comprised a flat plate provided with a central opening for the cable or conduit and with apertures for screwing the plate onto the flat surface of the wall through which the cable or conduit extends. One of the principal disadvantages of the prior art cable or conduit shield is that the cables and conduits rarely fit snugly within the opening of the shield unless the opening is exactly the correct size and shape. In order to achieve a snug fit, it was necessary to stock a large number of shields to accommodate cables of different sizes and shapes. Another disadvantage of prior art shields was that the shields could not be applied to existing cables without disconnecting the cable connections which, in some cases, was impossible.

It is, therefore, an outstanding object of the present invention to provide a cable and conduit shield that provides a snug fit.

Another object of the invention is the provision of a cable shield that is adjustable to accommodate a wide range of cables of different sizes and shapes.

A further object of the present invention is the provision of a cable and a conduit shield that is easy to install about newly-installed or existing cables or conduits with disconnecting them.

It is another object of the instant invention to provide a cable and conduit shield that has a neat, finished appearance.

With these and other objects in view, as will be apparent to those skilled in the art, the invention resides in the combination of parts set forth in the specification and covered by the claims appended hereto.

SUMMARY OF THE INVENTION

In general, the cable and conduit shield of the present invention comprises a pair of L-shaped flat plate elements. Each plate element has a base portion adapted to lie flat against a flat surface at the point of entry of the cable or conduit and a leg portion adapted to lie over the base of the other plate element to a variable degree, so that the inner edges of the joined plate elements define an adjustable opening for the cable or conduit. Means is provided for fastening the plate elements to the flat surface.

More specifically, the leg portion of each plate element is offset from the base, so that the leg and base occupy separate, parallel planes. The amount of offset is equal to the thickness of the plate. The inner edges that define the cable or conduit opening are provided with concave curvatures that enable the cable and conduit shield to fit snugly about round or oval cables such as pipes or wire cables.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
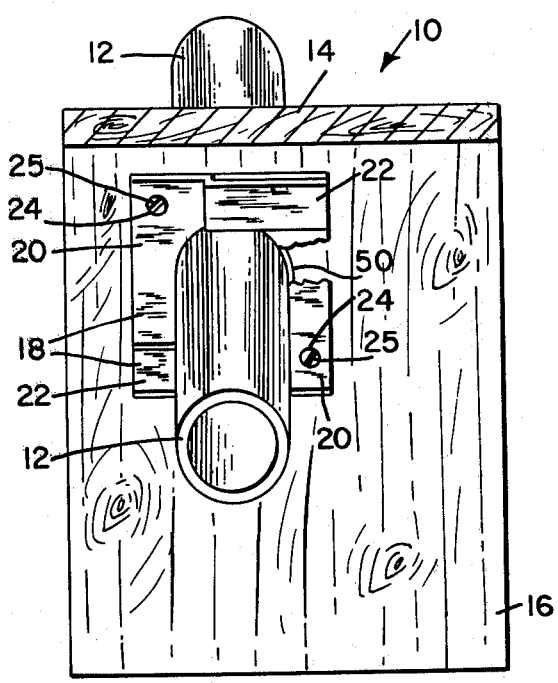
FIG. 1 is a perspective view showing a preferred form of a conduit shield embodying the principles of the present invention and shown installed about a conduit at the point of entry into a building.

Referring particularly to FIGS. 1-4, the conduit shield of the present invention, generally indicated by the reference numeral 10, is shown in FIG. 1 as assembled about a conduit 12 that extends through a wall 14 having a flat outer surface 16.

Figure 2:
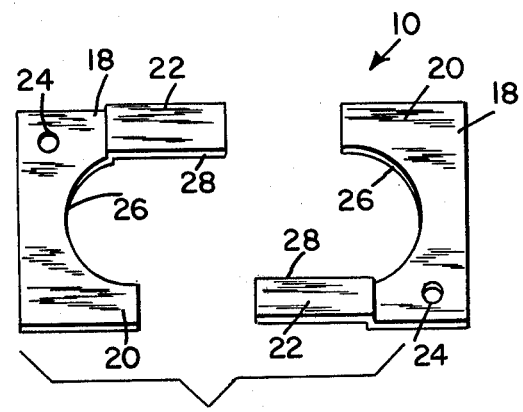
FIG. 2 is a perspective view of the two L-shaped plate elements that comprise the conduit shield of the preferred embodiment.
Figure 4:
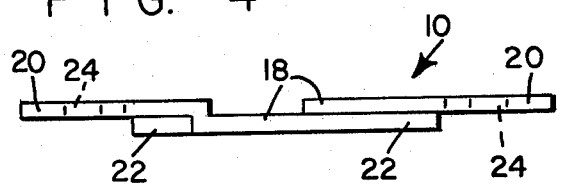
FIG. 4 is a plan view of the shield.

As shown in FIG. 2, the conduit plate 10 comprises two identical L-shaped flat plate elements 18. Each plate element 18 consists of a base portion 20 and a leg portion 22 that extends from and is offset from the base. The leg 22 is located in a plane that is parallel with and spaced from the plane of the base portion. The leg and base portions are of substantially the same thickness and the leg is offset from the base an amount equal to the thickness of the base, so that, when the two elements 18 are assembled (as shown in FIGS. 1 and 4), the leg portion 22 of each plate element 18 overlies the base portion 20 of the other element. Each base portion 20 is provided with an aperture 24 for receiving a screw 25 for fastening the assembled plate elements to surface 16 of the wall structure 14, as shown in FIG. 1.

Figure 3:
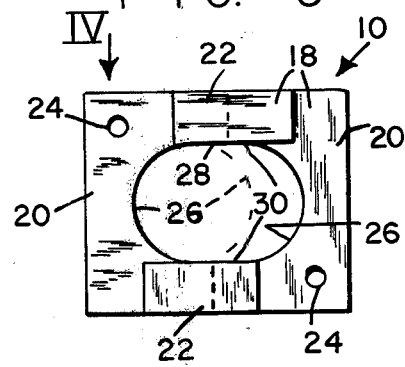
FIG. 3 is a front elevational view of the shield showing the plate elements of FIG. 2 in joined position.

The inner edge 26 of the base portion 20 has a concave curvature preferably in the form of a semi-circle, as shown in FIG. 2. The inner edge 28 of the leg portion 22 is straight and extends generally tangential to the edge 26. When the plate elements are joined, as shown in FIGS. 1-3, the edges 26 and 28 define a conduit opening 30. The leg 22 of each plate element is adjustably mounted on the base portion of the other plate element, so that the opening 30 may range from the larger generally eliptical shape (shown in full lines in FIG. 3) to a more nearly circular shape (shown in dotted lines in FIG. 3) and also as shown in FIG. 1.

Figure 5:
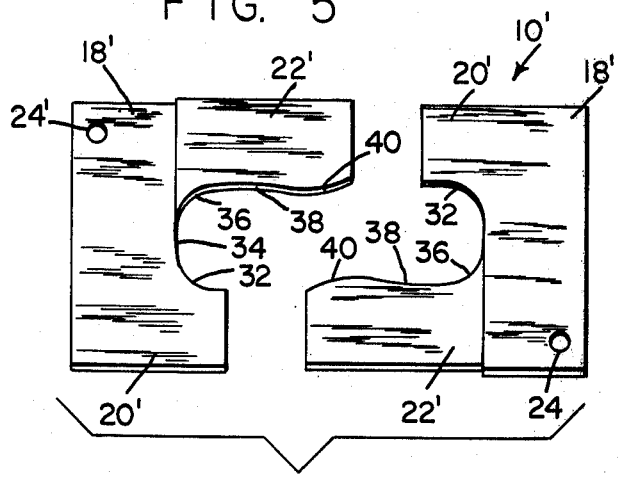
FIG. 5 is a perspective view of a pair of L-shaped plate elements that comprise a modified cable shield.

Referring to FIGS. 5-9, there is shown a modified cable shield, generally indicated by the reference numeral 10' and comprising two identical L-shaped plate elements 18'. Each plate element 18' consists of a base portion 20' and a leg portion 22' extending from and offset from the base 20' to the same extent as in the preferred embodiment as shown in FIG. 5. Each base 20' is provided with an aperture 24' by which the joined plate elements are attached to the flat surface of a wall structure at the point of entry of the cable. The modified plate 18' differs from the preferred plate 18 primarily in the shape of the inner edges of the base and leg portions. The inner edge of base portion 20' has a curved concave section 32 spaced from the leg portion 22' by a generally straight section 34. The inner edge of leg portion 22' has a curved concave section 36 that extends from the straight section 34 of the base and a generally straight section 38 that extends to the end 40 of the leg which is slightly enlarged, as shown in FIG. 5.

Figure 6:
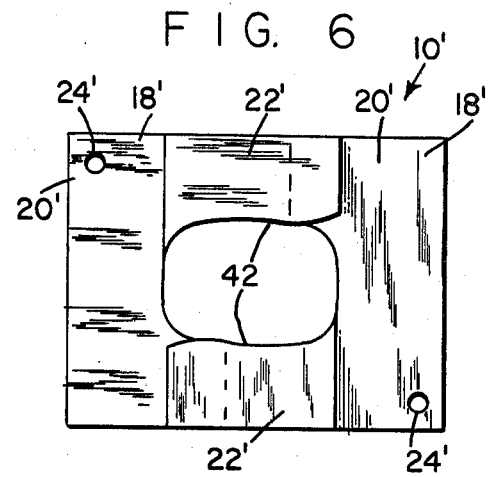
FIGS. 6-9 are front elevational views of the plates shown in FIG. 5 joined in a variety of relative positions to form cable openings of different sizes and shapes.
Figure 7:
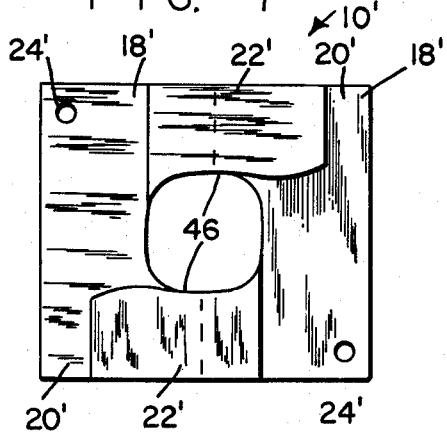

When two of the plates 18' are joined, as shown in FIGS. 6–9, the inner edges of the base and leg portions of the plates define a cable opening. The plates 18' can be joined in a plurality of relative positions, so that the cable opening can assume a plurality of sizes and shapes, as indicated in FIGS. 6–9. For instance, FIG. 6 shows the largest opening that can be formed. When the plates 18 are in the position shown in FIG. 6, the top-to-bottom portions of the plates are aligned and the leg portions partially overlap the base portion. This forms the generally eliptical opening 42. By adjusting the amount of overlap of the leg 22' on the base 20', the size of the cable opening can range from the large eliptical opening 42 (shown in FIG. 6) in which the legs are in partially-overlapping position to the much smaller eliptical opening 44 (shown in FIG. 8) in which the leg portion 22 fully overlap the base portions 20. FIG. 7 shows an intermediate overlapping position in which a generally round opening 46 is formed.

Figure 8:
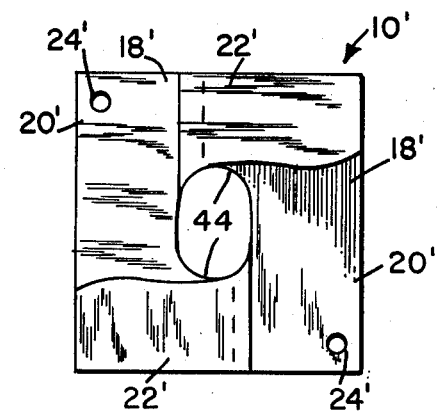
Figure 9:
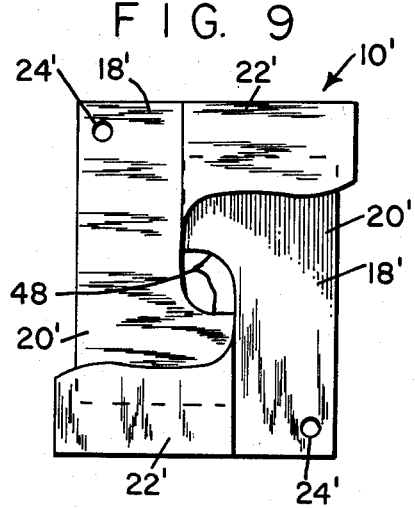

The size of the cable opening can be further reduced by maintaining plates 18' in the same endwise position shown in FIG. 8 in which the legs 22' fully overlap the bases 20 and shifting the plates laterally to form cable openings that range from the opening 44 shown in FIG. 8 to the smallest opening 48 shown in FIG. 9.

The operation and advantages of the present invention will now be readily understood in view of the above description. Referring to FIG. 1, a conduit 12 is shown extending through an opening 50 in a building wall structure 14. The conduit 12 may be part of an existing or of a new installation. A pair of plate elements 18, as shown in FIG. 2, are positioned about the conduit 12, so that the inner edges 26 and 28 of the base and leg portions 20 and 22, respectively, of each element 18 fit snugly about the outer surface of conduit 12. In the joined position shown in FIG. 1, the leg portion 22 of each element 18 overlies the base portion 20 of the other element. Screws 25 are inserted into apertures 24 and screwed into wall structure 14 to hold the assembled shield in place. Shield 10 fits snugly about conduit 12 and covers the opening 50 in the wall structure to prevent moisture, air, dust, or insects from passing through the opening 50. Also, the shield 10 presents a neat finished appearance to the conduit in the installation, as shown in FIG. 1. The two plate elements 18 that comprise the conduit shield 10 of the present invention can be joined in a plurality of relative position to accommodate eliptically-shaped conduits, such as electrical cable within a certain size range.

The modified cable shield 10' shown in FIGS. 5–9 is installed in the same manner as conduit 10, shown in FIG. 1. Although the inner edges of the assembled cable plates 18' that form the conduit opening do not fit as snugly about a round conduit, as does the preferred conduit 10, they define a wider range of opening sizes as shown in FIGS. 6–9, to accommodate round and eliptical cables extending in a wide range and still provide a relatively snug fit about the conduit.

It is obvious that minor changes may be made in the form and construction of the invention without departing from the material spirit thereof. It is not, however, desired to confine the invention to the exact form shown and described, but it is desired to include all such as properly come within the scope claimed.

The invention having been thus described, what is claimed as new and desired to secure by Letters Patent is:

1. A shield for cables and the like at the point of entry into a wall structure, comprising a pair of L-shaped flat plate elements, each of said elements consisting of:
    (a) a base portion adapted to lie flat against a flat surface at the point of entry of the cable,
    (b) a leg portion adapted to lie over the base of the other plate element to a variable degree, so that the inner edges of the joined plate elements define an adjustable opening for the cable, and
    (c) means for fastening the plate elements to said flat surface.

2. A shield as recited in claim 1, wherein the leg portion of each plate element is offset from the base so that the leg and base occupy separate parallel planes.

3. A shield as recited in claim 2, wherein the leg and base portions of each plate are the same thickness and the amount of offset between the base portion and leg portion is equal to said thickness.

4. A shield as recited in claim 1, wherein the inner edge of the base portion has a concave curvature.

5. A shield as recited in claim 4, wherein the inner edge of the base portion is semi-circular and the inner edge of the leg portion is straight and tangential to the inner edge of the base portion.

6. A shield as recited in claim 4, wherein the inner edge of the leg portion has a concave curvature where the leg portion extends from the base portion.

7. A shield as recited in claim 1, wherein the means for fastening the plate elements to a flat surface comprises an aperture in each plate for reception of a fastening element.

8. A shield as recited in claim 6, wherein the leg and base of each plate element are integral.

* * * * *